United States Patent [19]
Minor

[11] Patent Number: 5,505,767
[45] Date of Patent: Apr. 9, 1996

[54] SYSTEM AND PROCESS FOR COLLECTING SULFURIC ACID FUMES

[76] Inventor: Cheryl Minor, 2560 Country Club Rd., Winston Salem, N.C. 27104

[21] Appl. No.: 254,640

[22] Filed: Jun. 8, 1994

[51] Int. Cl.$^6$ .......................... B01D 29/56; B01D 46/12
[52] U.S. Cl. ............... 95/287; 95/212; 95/214; 55/233; 55/259
[58] Field of Search .............. 95/187, 188, 203, 95/206, 210–212, 214, 223, 235, 287; 55/233, 234, 259

[56] References Cited

U.S. PATENT DOCUMENTS

| | | | |
|---|---|---|---|
| 2,901,061 | 8/1959 | Hartig et al. | 95/211 |
| 3,122,594 | 2/1964 | Kielback | 95/211 X |
| 3,324,630 | 6/1967 | Teller et al. | 95/211 |
| 3,409,279 | 11/1968 | Metrailer | 95/211 X |
| 3,780,499 | 12/1973 | Dorr et al. | 95/211 |
| 3,944,401 | 3/1976 | Dörr et al. | 95/211 X |
| 4,029,751 | 6/1977 | Dörr et al. | 95/235 X |
| 4,533,367 | 8/1985 | Hadzismajlovic | 55/260 X |
| 4,547,353 | 10/1985 | Cameron | 95/187 X |
| 4,578,091 | 3/1986 | Borja | 95/214 |
| 4,753,663 | 6/1988 | Neefus et al. | 95/214 |
| 5,080,696 | 1/1992 | Marchad et al. | 95/187 |
| 5,180,405 | 1/1993 | Kuan | 55/259 X |

FOREIGN PATENT DOCUMENTS 0275402  1/1990  Germany .......................... 95/211

*Primary Examiner*—Robert Spitzer
*Attorney, Agent, or Firm*—Eugene Lieberstein; Michael N. Meller

[57] ABSTRACT

Sulfuric acid fumes generated in a manufacturing process are captured at the point of generation and transported at a flow rate of 3500 feet per minute to a filtration unit having a primary two-stage separator and a final three-stage separator. The primary separator is filled with spherical packing material, preferably of polypropylene, and the final separator consists of a composite pad of high efficiency filamentary packing material, preferably of polypropylene with increasingly smaller voids. Sulfuric acid is recovered from both separators for reuse and purified air is exhausted from the system. The removal efficiency exceeds 99%.

5 Claims, 1 Drawing Sheet

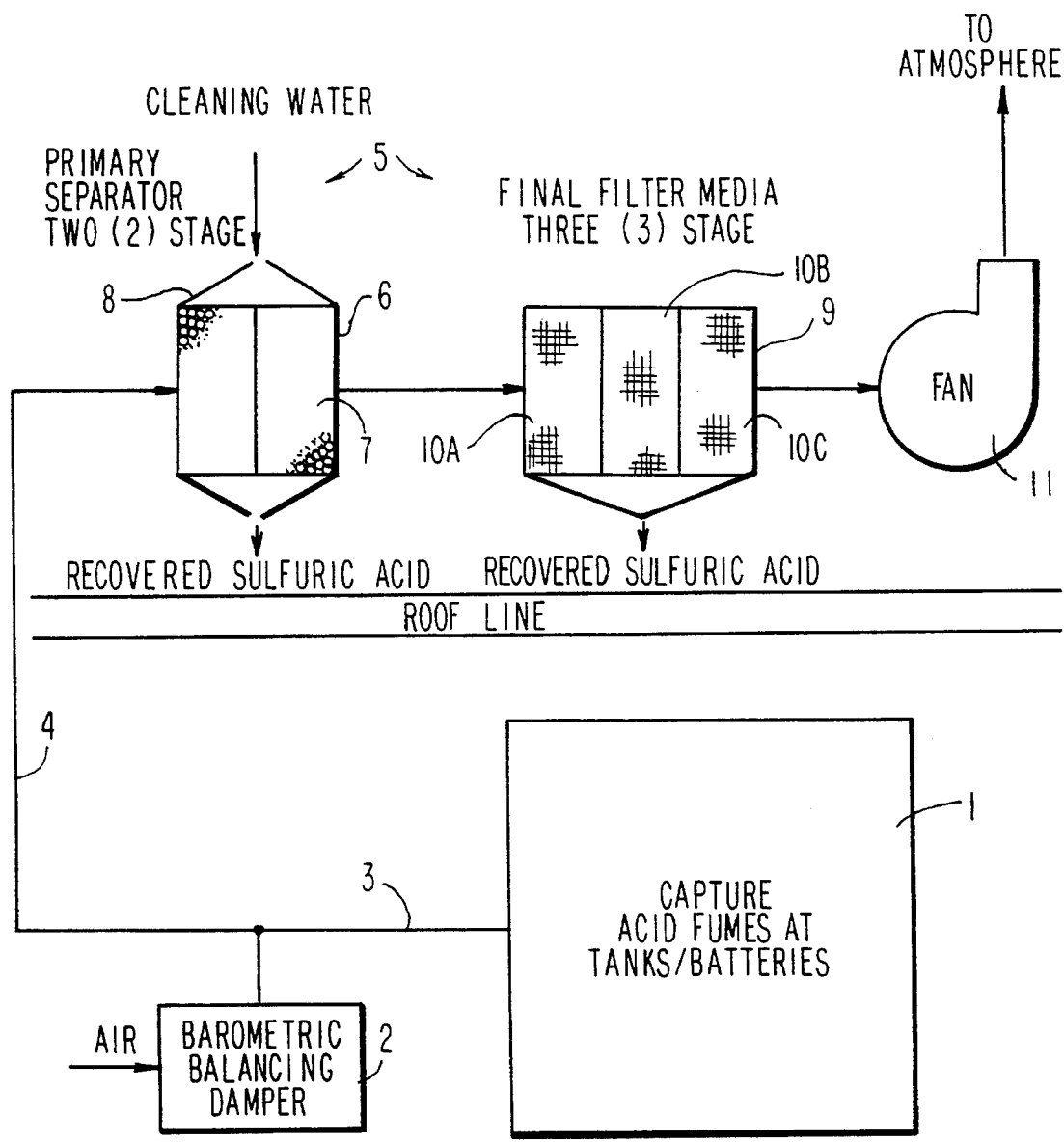

SYSTEM AND PROCESS FOR COLLECTING SULFURIC ACID FUMES

BACKGROUND OF THE INVENTION

The invention relates to the purification of effluent gases containing sulfuric acid fumes.

Collection and disposal of sulfuric acid fumes is a problem in many industrial processes, such as pickling, metal plating, plastic plating, aluminum anodizing and battery forming or charging. During the production of battery plates, for example, sulfuric acid is employed in a tank at around 200° F. Hot fumes escape and are generally pulled by vent fans normally mounted on the roof. The exit gases are then sent to a water scrubber such as the TRI-MER fan/separator sold by the Tri-Mer Corporation in Owosso, Mich. In this system the gases undergo primary laminar separation of heavy particles using high pressure, low volume water; secondary separation by hydrophobic tube pack; and tertiary separation by particle impaction and interception, at the end of which there is a 90° directional air change to preclude blocking. Contaminated water is sent to liquid waste treatment or process reuse. Although water is very effective in removing acid from the vent stream, a large amount of water is used to trap all of the acid fumes, resulting in a very dilute effluent leaving the scrubber. Generally, caustic solution is used to neutralize the water. Thus most of the acid is totally lost and must be disposed of at considerable expense. The present invention provides a less expensive and more efficient reduction in the amount of sulfuric acid fumes discharged to the atmosphere without the use of scrubbing water and permits recycling of recovered acid.

One object of the present invention is to provide a reduction in the amount of sulfuric acid discharged to the atmosphere by as much as 99.0 to 99.99%.

Another object of the invention is to reduce the worker's exposure level to the sulfuric acid fumes.

A further object of the invention is to provide recycling of the sulfuric acid per se instead of a dilute solution.

SUMMARY OF THE INVENTION

The system according to the invention comprises means to capture sulfuric acid fumes at the point of generation, means to transport the captured fumes to a filtration unit at a velocity of 3500 feet per minute, means to remove and collect acid from the filtration unit and a fan to remove purified air from the system. The filtration unit comprises a primary two-stage separator containing spherical packing material, preferably of polypropylene, and a final three-stage separator comprising a composite pad of high efficiency filamentary filter media, preferably of polypropylene, with increasingly smaller voids. The process according to the invention comprises the steps of capturing sulfuric acid fumes at the point of generation in a manufacturing process, transporting the captured fumes to a filtration unit where the fumes are passed through a primary two-stage separator consisting of spherical packing material and then through a final three-stage separator consisting of composite pad of filamentary filter media having increasingly smaller voids, removing sulfuric acid from the filtration unit and exhausting purified air.

BRIEF DESCRIPTION OF THE DRAWING

The drawing is a flow diagram of the system and process according to the invention.

DETAILED DESCRIPTION OF PREFERRED EMBODIMENTS

In a typical battery forming process, a tank where sulfuric acid fumes are generated is covered by an enclosure 1 which acts as the capture means during the formation of battery plates. For other types of battery formation, backdraft hoods and/or perforated piping may be installed as the capture means. By capturing the fumes at the point where they are generated, it is easier to reduce the worker's exposure to the fumes than to try to control the total air in the room. Most industries use an air flow of about 200 ft/min. capture velocity to ensure fume removal. The system according to the invention removes the fumes at just a slight negative static pressure of 1 to 3" w.c. prior to the filtration unit so that no more than 10% of air is pulled from the surrounding atmosphere. This new design requires less static pressure to operate and capture fumes, because it does not treat a whole room or area in capturing the fumes, and it does not require the contaminated air to be pulled or pushed through a conventional water-wash system. For processes subject to constantly fluctuating conditions, a barometric balancing damper 2 can be installed between the capture means 1 and the filtration unit 5 in order to maintain a constant air volume and static pressure in the system by allowing room air to enter to maintain sufficient air flow to assure constant volume.

After the sulfuric acid fumes are collected from the individual tanks via PVC pipes 3 to a common collector 4, they are transported at a transport velocity of 3500 ft./min. to the filtration unit 5 consisting of a primary two-stage separator 6 comprising a 20 inch deep pack of nonclogging, spherical type mass packing material 7. A suitable material is sold by LANTEC Inc. having an office in California, U.S.A. under the trade name "LANPAC" packing and contains 3.5 inch polypropylene spheres having a surface area of 45 sq.ft./cu.ft. and a void fraction of 92.5%. The saturated fumes are impinged upon the packing material and the removal of the contaminants is accomplished by slowing the flow of fumes to 250–500 feet per minute before passing them through the spherical packing material. This is accomplished by increasing the diameter of the duct work leading to the primary separator 6 which is designed with an interior water nozzle spray system 8 to allow for periodic wash-down of the two stages. The contaminated wash-down water is drained to a water pollution control system for further treatment may be reused in the production process.

The final three-stage separator 9 comprises a three section composite pad 10A, 10B, 10C of high efficiency filamentary media with increasingly smaller voids. This allows for the filaments to align perpendicular to the gas flow for maximum droplet removal efficiency. The interlacing is in sharp contrast to the random orientation of knitted mesh. The arrangement of the filaments causes a change in the direction of the vapor flow which enhances droplet removal by impaction, interception and centrifugal actions. These stages can have a variety of different types and sizes of mesh with filament diameters of from 0.002 to 0.062 inch and various void fractions, which provide for a selection of flow and pressure drop characteristics for specific site applications. Composite mesh pads incorporating several layers of different coarseness are efficient means of controlling pollutants. Heavy loads of mist containing solid particulates or liquids can be stopped with coarse styles, while less coarse styles can eliminate small liquid droplets. Suitable polypropylene composite mesh pads are sold by Kimre Incorporated in which 99% of the voids had a size of 10–15 microns in the first stage 10A, 5 microns in the second stage 10B and 2 microns in the third stage 10C. These pads can tolerate a maximum temperature of 180° F.

Field tests with the system and process according to the invention have demonstrated an overall efficiency of 99.99% on acid particles of 2 microns or more in diameter and an efficiency of 99.00% on particles as small as 1 micron in diameter. The flow rate of 250–500 feet per minute necessary to provide this efficiency is maintained by an exhaust fan 11 on the suction side of the unit. Because only air is exhausted, the material of construction of the fan is much cheaper than in conventional scrubbing systems, where the fan is composed of PVC or stainless steel.

Sulfuric acid is also recovered from the final separator stage 9. The recovered acid is of virgin quality with a sp.gr. of 1.6 and can be reused in the manufacturing process. Because no water is used to scrub the acid, the cost of the process according to the invention is less than half the cost of a conventional water scrubbing process. Moreover, the waste water generation from the water spray of the spherical packing is less than 5% of that in the conventional system.

It should be understood that various modifications of the system and process may be made without departing from the scope of the invention as defined in the claims.

I claim:

1. A process for separating and collecting sulfuric acid fumes from effluent gases generated during a manufacturing and plating production operation without the addition of water comprising the steps of, surrounding the plating production operation using hoods to form an enclosure, capturing said sulfuric acid fumes from said enclosure at a negative static pressure, passing the captured fumes firstly through polypropylene spherical packing material and then secondarily through a composite pad of filamentary polypropylene filter media having at least three stages of increasingly smaller voids removing recovered sulfuric acid from the last stage of said composite pad and exhausting purified air.

2. The process of claim 1 wherein the fumes are transported to said packing material at a transport velocity of 3500 feet per minute and then slowed to a rate of 250–500 feet per minute.

3. A process as defined in claim 1 wherein said polypropylene spherical packing material contains 3.5 inch spheres with a surface area of 45 sq. ft/cu.ft.

4. A waterless system for separating and collecting sulfuric acid fumes from effluent gases generated in a manufacturing and plating production operation comprising; capture means for forming an enclosure over said plating production operation, means for removing sulfuric acid fumes from said enclosure at a negative static pressure, a filtration unit for concentrating said sulfuric acid fumes, transportation means for transporting the sulfuric acid fumes from the enclosure to the filtration unit, outlet means for removing the concentrated sulfuric acid fumes from the filtration unit and a fan to exhaust purified air from the filtration unit, wherein the filtration unit comprises a primary separator containing polypropylene spherical packing material and a final separator of at least three stages each consisting of a composite pad of high efficiency polypropylene filamentary filter media with increasingly smaller voids.

5. The system according to claim 4, wherein the static pressure in the enclosure is between 1" to 3" w.c.

* * * * *